C. J. MELLIN.
STEAM ENGINE VALVE REVERSING GEAR.
APPLICATION FILED DEC. 30, 1914.
1,140,328.
Patented May 18, 1915.
6 SHEETS—SHEET 3.
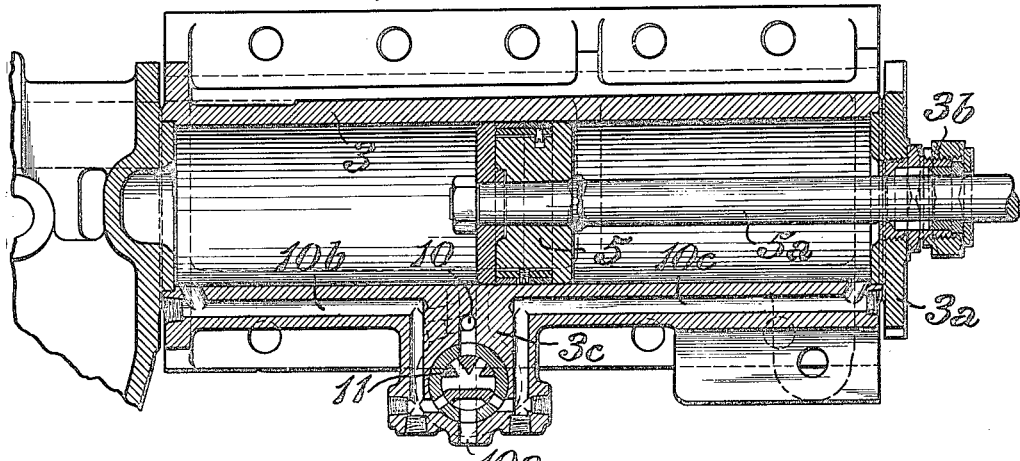
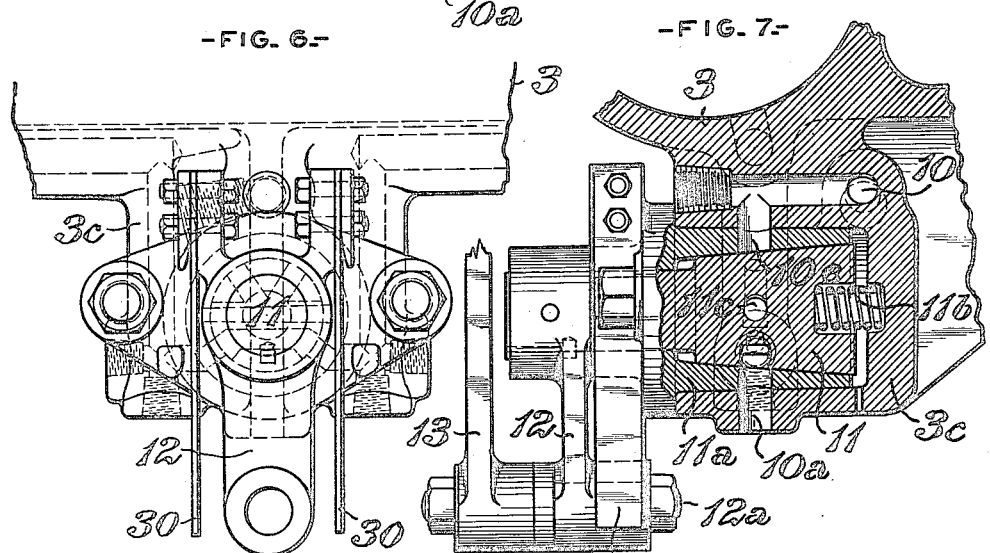
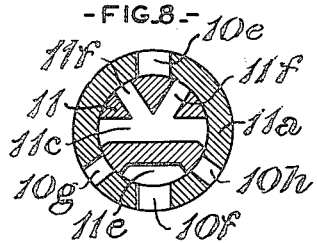
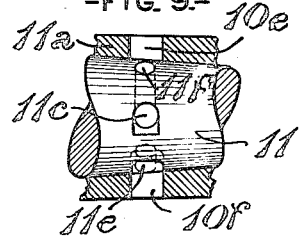
WITNESSES
Edward H. Wright
S. R. Bell
INVENTOR
Carl J. Mellin
By J. Snowden Bell
Atty.

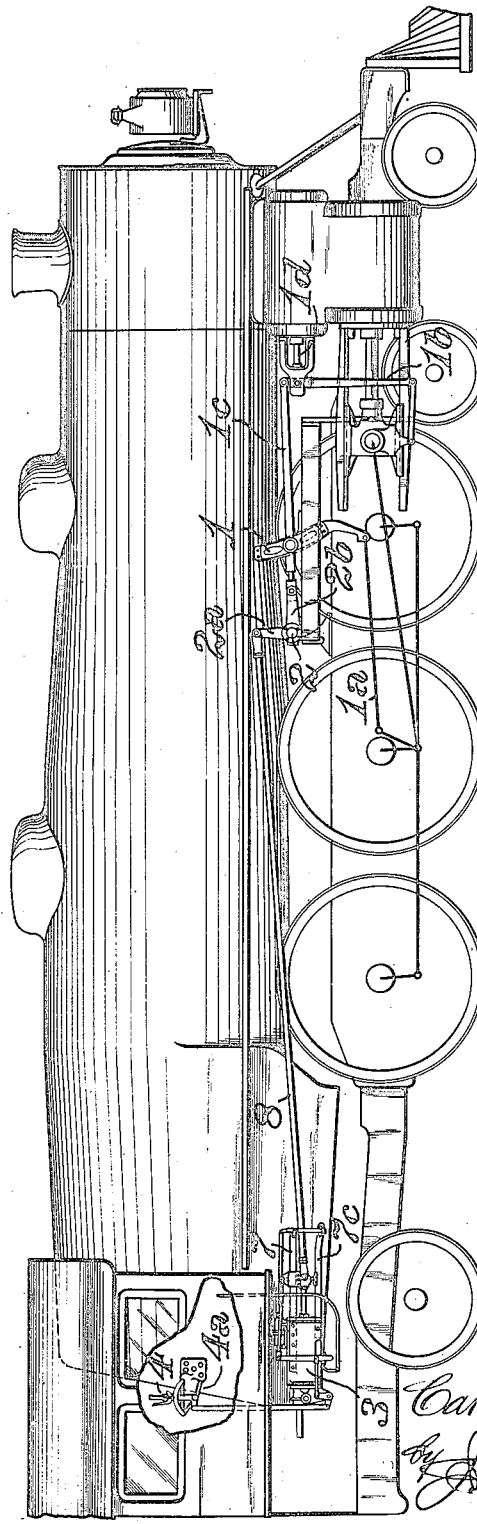

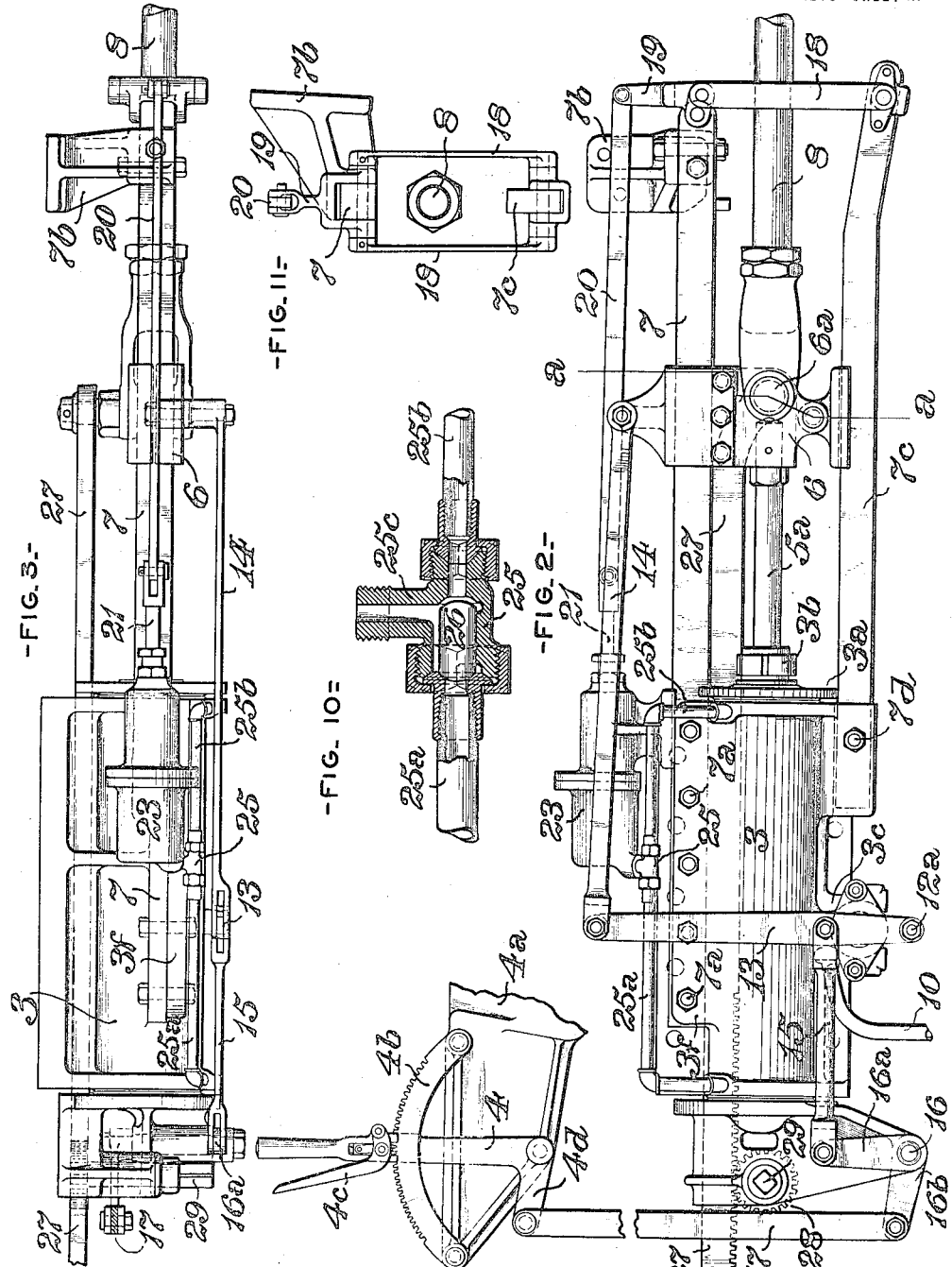

C. J. MELLIN.
STEAM ENGINE VALVE REVERSING GEAR.
APPLICATION FILED DEC. 30, 1914.
1,140,328.
Patented May 18, 1915.
6 SHEETS—SHEET 4.
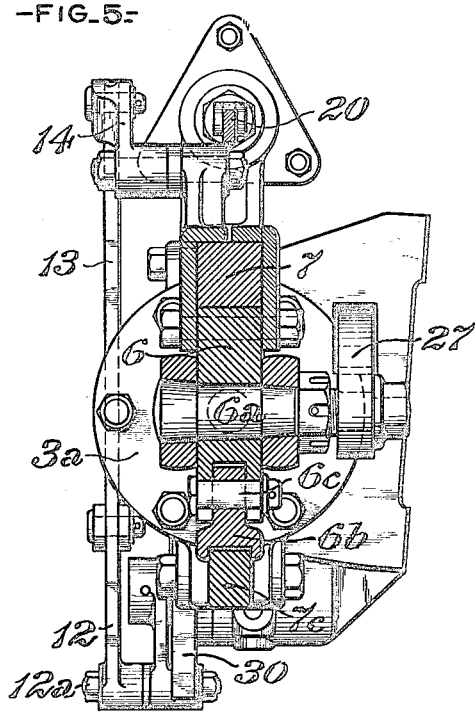
-FIG. 5.-
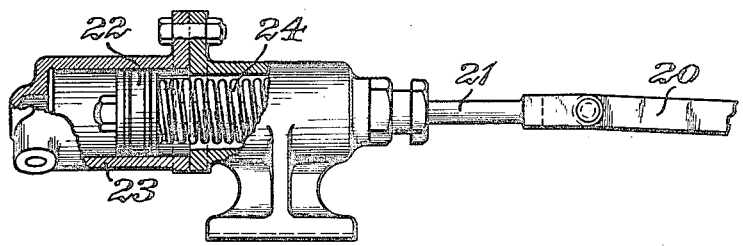
-FIG. 12.-

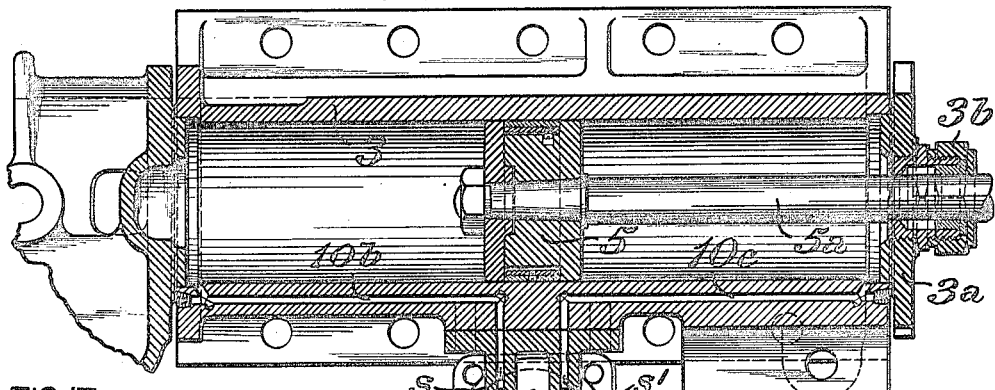
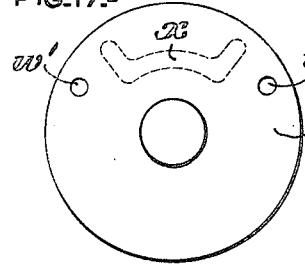
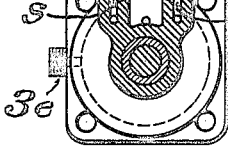
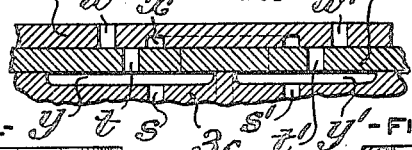
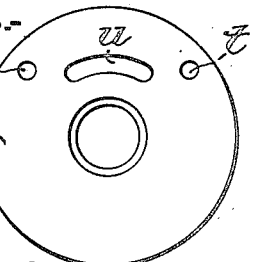
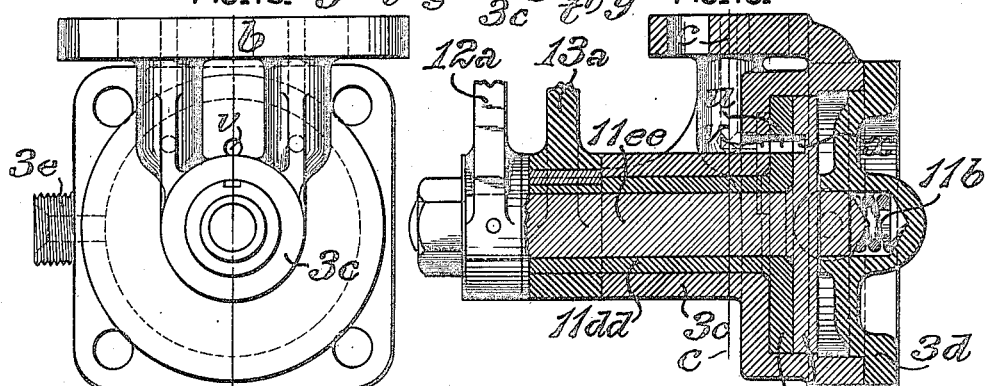
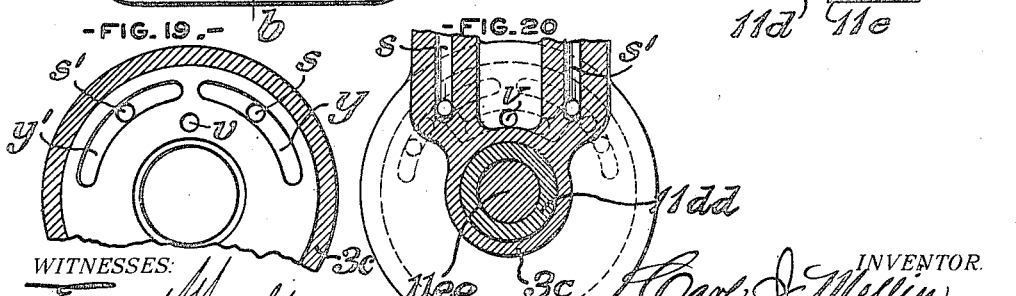

C. J. MELLIN.
STEAM ENGINE VALVE REVERSING GEAR.
APPLICATION FILED DEC. 30, 1914.

1,140,328.

Patented May 18, 1915.
6 SHEETS—SHEET 6.

WITNESSES:
Edward Wright.
S. R. Bell.

INVENTOR.
Carl J. Mellin
by Snowden Bell
ATTORNEY.

UNITED STATES PATENT OFFICE.

CARL J. MELLIN, OF SCHENECTADY, NEW YORK, ASSIGNOR TO AMERICAN LOCOMOTIVE COMPANY, OF NEW YORK, N. Y., A CORPORATION OF NEW YORK.

STEAM-ENGINE VALVE-REVERSING GEAR.

1,140,328.

Specification of Letters Patent.

Patented May 18, 1915.

Application filed December 30, 1914. Serial No. 879,677.

*To all whom it may concern:*

Be it known that I, CARL J. MELLIN, of Schenectady, in the county of Schenectady and State of New York, have invented a certain new and useful Improvement in Steam-Engine Valve-Reversing Gear, of which improvement the following is a specification.

My invention relates to power actuated reversing gear for steam engine valve mechanisms, more particularly those of locomotives, and its object, generally stated, is to provide means, of simple and inexpensive construction and ready applicability in connection with any of the various types of valve actuating mechanisms, whereby the piston of the reversing motor may be securely locked in any and all desired and adjusted positions; the mechanism be prevented from accidental displacement from adjusted position by jars or strains imparted from the valve gear or the movement of the engine; and the capability of immediate release and readjustment as desired, be afforded.

The improvement claimed is hereinafter fully set forth.

Figure 14:
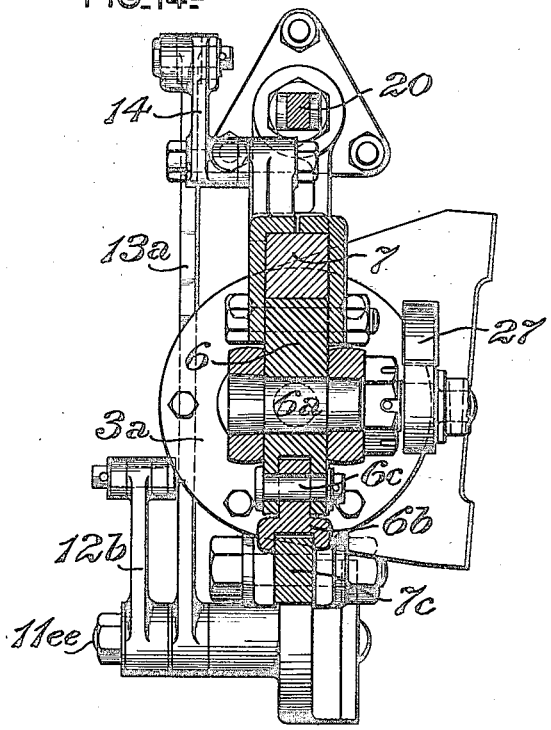
Figure 22:
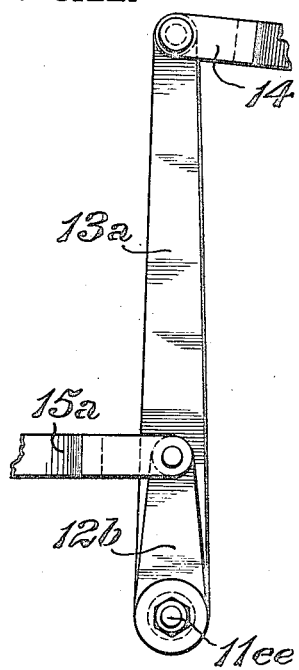

In the accompanying drawings: Figure 1 is a side view, in elevation, of a locomotive engine, illustrating the application of my invention in connection with a Walschaert valve gear; Fig. 2, a side view, in elevation, of the reversing cylinder and its accessories; Fig. 3, a plan or top view of the same; Fig. 4, a vertical longitudinal central section through the reversing cylinder; Fig. 5, a vertical transverse section, on an enlarged scale, on the line $a\,a$ of Fig. 2; Fig. 6, a side view, in elevation, of the lower central portion of the reversing cylinder, showing the arm for actuating the operating valve and the resisting springs thereof; Fig. 7, a view, partly in elevation and partly in longitudinal central section, of the operating valve and its casing and connections; Fig. 8, a transverse section through the operating valve and its bushing, taken in the plane of the ports; Fig. 9, a partial side view of the operating valve and longitudinal section through its bushing, showing the ports; Fig. 10, a view, partly in elevation and partly in longitudinal central section, of the double seated check valve and its casing; Fig. 11, an end view, in elevation, of the guides of the reversing cylinder cross head; Fig. 12, a view, partly in elevation and partly in longitudinal central section, of the friction relieving mechanism; Fig. 13, a vertical longitudinal central section through the reversing cylinder, illustrating the application of a structural modification of the operating valve; Fig. 14, a vertical transverse section through the cross head and guides, showing in elevation the valve casing of Fig. 13; Fig. 15, a front view, in elevation, and on an enlarged scale, of the valve casing of Fig. 13; Fig. 16, a vertical section through the same, on the line $b\,b$ of Fig. 15; Fig. 17, a view, in elevation, of the manually operated valve disk, as seen from the right; Fig. 18, a similar view of the motor operated valve disk; Fig. 19, a similar view of the valve casing, with the valves removed; Fig. 20, a transverse section, on the line $c\,c$ of Fig. 16; Fig. 21, a similar section, produced rectilinearly, through the valves and valve casing, illustrating the relation of the ports; and, Fig. 22, a view, in elevation, of the lever arms of the valves.

My invention, which is applicable in connection with any of the various known types of distribution valve mechanism, is illustrated in Fig. 1 as applied on a locomotive engine, for the control of a Walschaert valve gear of the ordinary construction, which comprises a link, 1, eccentric rod, $1^a$, combination lever, $1^b$, and radius bar, $1^c$, and is coupled to a distribution valve stem, $1^d$. The radius bar is coupled to the lower arm, $2^b$, of a reverse shaft, 2, and is raised and lowered throughout its range of traverse on the link, 1, by the action of fluid pressure, to change the direction of movement of the locomotive, or vary the point of cut off, as the case may be, by my improved reversing mechanism, hereinafter described, which is coupled to the upper arm, $2^a$, of the reverse shaft.

In the practice of my invention, I provide a fluid pressure reversing cylinder, 3, which is suitably supported in any convenient position relatively to the valve gear upon which it acts, being, in this instance, located below the cab of the locomotive. The supply of motive fluid to the reversing cylinder is effected and controlled by a manually operated reverse lever, 4, journaled on a bracket or support, 4ª, in the cab, and working over a toothed segment, 4ᵇ, with which it is engaged, as desired, by a pivoted latch lever, 4ᶜ. The cylinder, 3, is fitted with a properly packed piston, 5, fixed on a piston rod, 5ª, which passes through a stuffing box, 3ᵇ, in the forward head, 3ª, of the cylinder. A cross head, 6, is secured to the forward end of the piston rod, said cross head being fitted to slide between an upper fixed guide bar, 7, which is rigidly secured at its rear end, and for a substantial portion of its length forward thereof, to the cylinder, by bolts, 7ª, and a lower movable guide bar, 7ᶜ, which is pivotally connected, at its rear end, to the cylinder, by a bolt, 7ᵈ, and is coupled, at its forward end, to a locking mechanism, hereinafter described. The rear portion of the fixed guide bar, 7, is fitted truly against angular faces on the cylinder, these being formed, in the instance shown, on one side of, and at the bottom of, a longitudinal flange, 3ᶠ, cast on the cylinder, which might, equivalently, be longitudinally grooved for the reception of the rear portion of the guide bar. The long bearing on the cylinder which is thereby afforded, renders external support for the guide bar unnecessary, and effects the self alinement of the guide bar. If, however, an external support is considered to be advisable, the forward end of the fixed guide bar, 7, may, as shown in Figs. 2, 3, and 11, be secured to a bracket, 7ᵇ, properly attached to the locomotive. The cross head bears on the lower guide bar, preferably through a shoe, 6ᵇ, which is hinged to the body of the cross head by a pivot, 6ᶜ. The cross head carries a pin, 6ª, which is coupled, by a reach rod, 8, to the upper arm of the reverse shaft, 2. The forward end portion of the lower guide bar, 7ᶜ, may be outwardly inclined, relatively to the axial line of the cylinder and piston rod, as shown in Fig. 2, when the angularity of the reach rod so requires, and said guide bar is connected to an automatically operable locking mechanism, the construction of which will be presently described.

The supply and exhaust of motive fluid to and from the opposite ends of the reversing cylinder, 3, are directly effected by a ported operating valve, 11, which, as embodied in the construction shown in Figs. 4 to 9 inclusive, is of the oscillatory plug type, and is fitted to be moved about its axis in a bushing, 11ª, which is fixed in a valve casing, 3ᶜ, formed on the lower side of the reversing cylinder. The valve, 11, is held up to its seat in the bushing, 11ª, by a spring, 11ᵇ. Motive fluid is admitted to the valve casing through a supply conduit, 10, leading from a source of air or steam supply, and is exhausted therefrom through an exhaust port 10ª, leading to the atmosphere. Induction and eduction ports, 10ᵇ, 10ᶜ, lead from the valve casing to opposite ends of the reversing cylinder, said ports being in open communication, respectively, with ports, 10ᵍ and 10ʰ, in the valve bushing, 11ª, in which there are also formed a port, 10ᵉ, which is in open communication with the supply conduit, 10, and a port, 10ᶠ, which is in open communication with the exhaust port, 10ª. Communication between either of the induction and eduction ports, 10ᵇ and 10ᶜ, and the supply conduit, 10, is established through one or the other of two radial ports, 11ᶠ, and a communicating diametrical port, 11ᶜ, in the operating valve, and communication between either of said induction and eduction ports and the exhaust port, 10ª, is established through a circumferential exhaust cavity or recess, 11ᵉ, in the operating valve.

The projecting end or stem of the operating valve, has secured upon it an arm, 12, which is coupled by a pin, 12ª, to the lower end of a floating lever, 13, the upper end of which is coupled, by a link, 14, to the cross head, 6. The floating lever is also coupled, intermediate of its ends, by a link, 15, to an upwardly projecting arm, 16ª, on a horizontal rock shaft, 16, which is provided with an arm, 16ᵇ, extending at an angle to the arm, 16ª, and coupled, by a vertical link, 17, to an arm, 4ᵈ, projecting laterally from the reverse lever, 4.

The forward end of the pivoted lower cross head guide bar, 7ᶜ, is coupled, by links, 18, to a bell crank, 19, which is journaled on the upper guide bar, 7, and is, in turn, coupled, by a link, 20, to a frictional clamping and releasing mechanism, comprising a piston, 22, which is fixed on a rod, 21, to which the link, 20, is connected, and is fitted to traverse in a horizontal cylinder, 23, secured to the upper side of the reversing cylinder, 3; a spring, 24, bearing on the piston, 22, and on one end of the cylinder; and means for admitting fluid under pressure from the reversing cylinder to the cylinder, 23, from either end of the reversing cylinder. In the form shown in Figs. 2, 3 and 10, these means comprise a valve chest, 25, connected at its ends by conduits, 25ª, 25ᵇ, with the opposite ends of the reversing cylinder, and connected intermediately with the cylinder, 23, of the clamping and releasing mechanism, by a conduit, 25ᶜ, and a double seated check valve, 26, which is fitted to traverse longitudinally in the valve chest, 25, and to open and close communication between the cylinder, 23, on the side of its piston, 22, opposite that on which the spring, 24, bears, and one or the other (according to its position) of the conduits, 25ª, and 25ᵇ.

In order to enable the reverse gear to be manually operated, in the event of breakage of the piping connected to the reversing cylinder, or the failure of motive fluid supply therefor, a toothed bar, 27, extending parallel with the reversing cylinder, is coupled, at its forward end, to the cross head pin, 6ª, and its teeth are engaged, adjacent to its rear end, by a pinion, 28, fixed upon a horizontal shaft, 29, one end of which is squared to receive the hub of an operating bar. By the manual rotation of the pinion, 28, the cross head and connected reach rod and reverse shaft may be moved in either direction, as may be desired.

In the ordinary handling of the engine, it is usually found desirable to restrict the degree of opening of the operating valve, and for this purpose, two light spring blades, 30, may, as shown in Figs. 6 and 7, be secured to the outer end of the operating valve chest, on opposite sides of the arm, 12, of the valve, said springs offering an increasing resistance to the movement of the arm and valve, from starting to full port opening, when a dead stop is reached. The engineer can increase the speed of the reversing cylinder piston by increasing pressure on the hand reverse lever, and normally only half the port opening is used.

Taper plug valves of the type hereinbefore described have, in some cases, been found objectionable, by reason of sticking, due to expansion when steam is used as the motive fluid of the reversing cylinder, although it is believed that this objection has been fully overcome by making these valves of steel. If, however, it is deemed to be of sufficient importance to make the adoption of a different type of operating valve desirable, this may be effected by the application of a rotating disk valve, as, for example, by the structural modification illustrated in Figs. 13 to 22 inclusive, in which two rotatory disk valve sections, 11ᵈ, and 11ᵉ, are substituted for the single plug valve, 11, before described.

The valve section, 11ᵈ, abuts against a flat face in the valve casing, 3ᶜ, and is formed integral with, or fixed upon, a tubular stem, 11ᵈᵈ, which is fitted to be moved about its axis in a bearing forming an extension of the casing, 3ᶜ, and bored to receive the stem. A lever, 13ª, is fixed to the outer end of the valve stem, 11ᵈᵈ, and is coupled, at its upper end, by a link, 14, to the cross head, 6, as in the construction first described. The valve section, 11ᵉ, abuts against the inner flat face of the valve section, 11ᵈ, and is formed integral with, or fixed upon, a stem, 11ᵉᵉ, which is fitted to be moved about its axis in the tubular stem, 11ᵈᵈ. The valve stem, 11ᵉᵉ, has, secured upon its outer end, an arm, 12ᵇ, which is coupled by a link, 15ª, to the hand reverse lever, 4. The valve sections are held to their seats by a spring, 11ᵈ, bearing on a central hub or boss on the inner side of the valve section, 11ᵉ, and on the cap, 3ᵈ, of the valve casing, and motive fluid, as steam or compressed air, is admitted to said casing, between the cap, 3ᵈ, and the valve section, 11ᵉ, through a supply pipe, (not shown), which is connected to a threaded tubular projection, 3ᵉ, on the valve casing.

The induction and eduction ports, 10ᵇ and 10ᶜ, of the reversing cylinder, are in open communication with the upper ends of ports, s and s', respectively, which ports are formed in the valve casing, 3ᶜ, and are open, at their lower ends, to the outer or left hand side of the valve section, 11ᵈ. Two inlet ports, t and t', extend through said valve section, in position to be brought into communication with the cylinder ports, s and s', respectively, and an exhaust slot, u, which is curved concentrically with the axis of the valve section, is formed therein, between the ports, t and t', said slot being in constant open communication with a final exhaust port, v, in the valve casing. Two inlet ports, w, w', extend through the valve section, 11ᵉ, and an exhaust cavity, x, is formed therein, between said ports, and on the side of the valve section adjoining the valve section, 11ᵈ, the main portion of said groove being curved concentrically with the common axis of the sections, and its end portions extending radially outwardly a sufficient distance to communicate with two ports, t, t', and two grooves, y, y', which are formed in the face of the valve casing, 3ᶜ, and which are curved concentrically with the common axis of the sections.

It will be obvious to those skilled in valve construction and operation, that the specific form and relation of the ports of the valve sections above described are not essential, and that the same may be varied, in the discretion of the constructor, without variation of operative principle. It should also be noted that, if desired, the connections of the hand reverse lever and the cross head, may be made, respectively, with the inner and the outer valve sections, instead of with the outer and the inner sections, respectively, as shown in the drawings, the port arrangement being correspondingly adjusted, but the construction shown is preferable by reason of the easier working of the outer valve section. The relative movement of the hand lever arm and floating lever is properly limited by stops, so as to prevent over-travel or fouling of the gear, and, while the upward extension of said arm and lever, as shown, is preferable, as resulting in the better angularity, length, and throw thereof, the operating connections may, if desired, be made on the opposite side of the valve, or the valve ports may be correspondingly changed in position.

The operation of a reversing gear substantially as hereinbefore set forth, will now be described. In normal or inoperative position, that is to say, when the valve gear is in any desired adjustment for forward or back motion, the pistons of the reversing cylinder, 3, and the cylinder, 23, of the clamping and releasing mechanism, are not under pressure, and the spring, 24, of said mechanism, forces the piston, 22, thereof, to the left hand limit of its traverse, this movement of the piston, through its connections, 20, 19 and 18, with the pivoted lower guide bar, 7ᶜ, clamping said bar against the shoe, 6ᵇ, of the cross head, and locking the piston of the reversing cylinder and the connected reverse shaft, 2, firmly against movement in either direction. When it is desired to adjust the valve gear in either direction, the latch lever, 4ᶜ, of the hand reverse lever, 4, is released from the segment, 4ᵇ, and the reverse lever is moved in the appropriate direction, such movement, which the pin which couples the cross head connecting link, 14, to the floating lever, 13, acts as a fulcrum, actuating the operating valve, 11 or 11ᵈ, and admitting motive fluid to the reversing cylinder, 3, on the side of its piston, 5, proper to effect movement in the direction desired. A portion of the motive fluid which is thus admitted to the reversing cylinder, passes therefrom, through the conduit, 25ª, or the conduit, 25ᵇ, as the case may be, to the casing of the double seated check valve, 26, which it forces to its seat at the end of the opposite conduit, and passes from the casing, through the conduit, 25ᶜ, to the cylinder, 23, of the clamping and releasing mechanism. Said piston is thereby forced to the right, overcoming the clamping action of the spring, 24, and releasing the lower guide bar, 7ᶜ, from its locking pressure on the cross head, 6, which is then, with its connections, moved in the desired direction by the pressure on the piston, 5, of the reversing cylinder. The movement of the cross head and its connections continues so long as the engineman continues to move the hand reverse lever. Upon the cessation of the movement of the reverse lever, the pin which couples the hand lever connecting link, 15, to the floating lever, 13, becomes a fulcrum, and the movement of the cross head, through the link, 14, moves the operating valve in the opposite direction and cuts off the supply of motive fluid from the reversing cylinder. This successive admission and closure can, for movement in either direction, be repeated in steps, or effected by a single movement of the reverse lever, up to the limit of traverse of the reverse lever on its segment. The reversal of position of the operating valve by the movement of the cross head, exhausts the motive fluid from the reversing cylinder and the cylinder of the clamping and releasing mechanism, and the spring of the latter thereupon locks the gear in adjusted position, in which it remains until another movement of the reverse lever, in one or the other direction, is made by the engineman.

I claim as my invention and desire to secure by Letters Patent:

1. In a valve reversing mechanism, the combination of a fluid pressure reversing motor, a manually operable valve controlling said motor, a link pivoted to the cross head and to the controlling valve, for automatically effecting the closure of said valve, and means, automatically operable upon the closure of said valve, for locking the motor in desired position.

2. In a valve reversing mechanism, the combination of a fluid pressure reversing motor, a manually operable valve controlling said motor, a link pivoted to the cross head and to the controlling valve for automatically effecting the closure of said valve, means automatically operable upon the closure of said valve for locking the motor in desired position, means, automatically operable by the admission of motive fluid to the motor, for releasing said locking means, and means, operable by the closure of the controlling valve, for engaging said locking means.

3. In a valve reversing mechanism, the combination of a fluid pressure reversing cylinder, a piston fitting therein, a piston rod fixed to said piston, a cross head thereon adapted for connection to a valve gear, a cross head guide bar fixed to the reversing cylinder, a cross head guide bar pivotally connected to said cylinder, and means for clamping the cross head between said guide bars.

4. In a valve reversing mechanism, the combination of a fluid pressure reversing cylinder having longitudinal bearing faces at an angle one to the other, a piston fitting said cylinder, a piston rod fixed to said piston, a cross head thereon adapted for connection to a valve gear, a cross head guide bar fitted against the longitudinal bearing faces of the reversing cylinder, bolts securing said guide bar to the cylinder, a cross head guide bar pivotally connected to said cylinder, and means for clamping the cross head between said guide bars.

5. In a valve reversing mechanism, the combination of a fluid pressure reversing cylinder, a piston fitting therein, a piston rod fixed to said piston, a cross head thereon adapted for connection to a valve gear, a cross head guide bar fixed to the reversing cylinder, a cross head guide bar pivotally connected to said cylinder, a movable abutment, connections coupling said abutment to the pivotally connected guide bar, and a spring acting on said abutment in direction to exert clamping action of said pivotally connected guide bar on the cross head.

6. In a valve reversing mechanism, the combination of a fluid pressure reversing cylinder, a piston fitting therein, a piston rod fixed to said piston, a cross head thereon adapted for connection to a valve gear, a cross head guide bar fixed to the reversing cylinder, a cross head guide bar pivotally connected to said cylinder, a supplemental fluid pressure cylinder, a piston fitted therein, a conduit leading from the reversing cylinder thereto, and connections coupling said piston to the pivotally connected guide bar.

7. In a valve reversing mechanism, the combination of a fluid pressure reversing cylinder, a piston fitting therein, a piston rod fixed to said piston, a cross head thereon adapted for connection to a valve gear, a combination of a fluid pressure reversing cylinder, a cross head guide bar pivotally connected to said cylinder, a supplemental fluid pressure cylinder, a piston fitted therein, a conduit leading from the reversing cylinder thereto, an automatically operable valve controlling communication between said conduit and opposite ends of the reversing cylinder, and connections coupling the piston of the supplemental cylinder to the pivotally connected guide bar.

8. In a valve reversing mechanism, the combination of a fluid pressure reversing cylinder, a piston fitting therein, a piston rod fixed to said piston, a cross head thereon adapted for connection to a valve gear, a cross head guide bar fixed to the reversing cylinder, a cross head guide bar pivotally connected to said cylinder, a fluid pressure clamping and releasing cylinder, a releasing piston fitted therein and coupled to the pivotally connected guide bar, and a locking spring bearing on said piston in opposite direction to that of fluid pressure thereon.

9. In a valve reversing mechanism, the combination of a fluid pressure reversing cylinder, a piston fitting therein, a piston rod fixed to said piston, a cross head thereon adapted for connection to a valve gear, a manually operable valve controlling said reversing cylinder, a link pivoted to the cross head and to the controlling valve for automatically effecting the closure of said valve by the movement of the reversing cylinder piston, means, automatically operable by the closure of said valve, for normally locking the cross head in each of its adjusted positions, and means, actuated by the admission of fluid pressure to the reversing cylinder, for releasing said cross head.

10. In a valve reversing mechanism, the combination of a fluid pressure reversing cylinder, a piston fitting therein, a piston rod fixed to said piston, a cross head thereon adapted for connection to a valve gear, a valve mechanism for effecting admission and exhaust of motive fluid to and from said cylinder, a manually operable arm connected to said valve mechanism and effecting its opening movement, and a link pivotally connecting said valve mechanism to the cross head for effecting its closing movement by the movement of the cross head.

11. In a valve reversing mechanism, the combination of a fluid pressure reversing cylinder, a piston fitting therein, a piston rod fixed to said piston, a cross head thereon adapted for connection to a valve gear, a manually operable reverse lever, a valve for admitting motive fluid to the reversing cylinder, an arm fixed to said valve, a link coupling said arm to the reverse lever, and springs fixed on opposite sides of said arm and adapted to oppose increasing resistance to its movement in either direction toward full opening position.

12. In a valve reversing mechanism, the combination of a fluid pressure reversing cylinder, a piston fitting therein, a piston rod fixed to said piston, a cross head thereon adapted for connection to a valve gear, a manually operable reverse lever, a valve for admitting motive fluid to the reversing cylinder, a floating lever coupled, at one end, to said valve, a link coupling the opposite end of the floating lever to the cross head, and a link coupling said lever, between its ends, to the reverse lever.

13. In a valve reversing mechanism, the combination of a fluid pressure reversing cylinder, a piston fitting therein, a piston rod fixed to said piston, a cross head thereon adapted for connection to a valve gear, a cross head guide bar fixed to the reversing cylinder, a cross head guide bar pivotally connected to said cylinder, a valve for admitting motive fluid to said cylinder, a manually operable arm fixed to said valve and effecting its opening movement, a link connecting said arm to the cross head for effecting the closure of the valve by the movement of the cross head, an automatically operable clamping and releasing mechanism, and connections coupling said mechanism to the pivotally connected cross head guide bar.

14. In a valve reversing mechanism, the combination of a fluid pressure reversing cylinder having longitudinal bearing faces, a piston fitting said cylinder, a piston rod fixed to said piston, a cross head thereon adapted for connection to a valve gear, a cross head guide bar fitting against the longitudinal bearing faces of the reversing cylinder and secured thereto, valve mechanism controlling the movements of the piston, and a link pivoted to said valve mechanism and to the cross head.

15. In a valve reversing mechanism, the combination of a fluid pressure reversing cylinder having longitudinal bearing faces, a piston fitting said cylinder, a piston rod fixed to said piston, a cross head thereon adapted for connection to a valve gear, a cross head guide bar fitting against the longitudinal bearing faces of the reversing cylinder and secured thereto, a valve mechanism controlling the supply and exhaust of motive fluid to and from the piston, manually operable means for imparting opening movement to said valve mechanism, and a link pivoted to the cross head and to the valve mechanism, for imparting closing movement to the valve mechanism by the movement of the cross head.

CARL J. MELLIN.

Witnesses:
WILL W. HAMBLY,
E. I. SCHAUBER.